(«12») United States Patent
Yoshimura

(10) Patent No.: US 9,189,113 B2
(45) Date of Patent: Nov. 17, 2015

(54) CAPACITIVE TOUCH PANEL SENSOR SYNCHRONIZED WITH DISPLAY DRIVING OPERATION AND TOUCH PANEL DISPLAY DEVICE HAVING THE SAME

(71) Applicant: Hideo Yoshimura, Yongin (KR)

(72) Inventor: Hideo Yoshimura, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 182 days.

(21) Appl. No.: 13/900,732

(22) Filed: May 23, 2013

(65) Prior Publication Data

US 2013/0321332 A1  Dec. 5, 2013

(30) Foreign Application Priority Data

Jun. 5, 2012 (KR) .................. 10-2012-0060243

(51) Int. Cl.
*G06F 3/041* (2006.01)
*G06F 3/044* (2006.01)

(52) U.S. Cl.
CPC .............. *G06F 3/044* (2013.01); *G06F 3/0418* (2013.01)

(58) Field of Classification Search
CPC ................. G06F 3/044; G06F 3/0418; G06F 2203/04107; G09G 3/36; H03K 17/962
See application file for complete search history.

(56) References Cited

U.S. PATENT DOCUMENTS

| 2002/0089491 A1* | 7/2002 | Willig ............................ 345/173 |
| 2008/0062140 A1* | 3/2008 | Hotelling et al. .............. 345/173 |
| 2008/0157893 A1* | 7/2008 | Krah ......................... 331/177 R |
| 2011/0210941 A1* | 9/2011 | Reynolds et al. .............. 345/174 |

FOREIGN PATENT DOCUMENTS

| KR | 10 2008-00612 A | 7/2008 |
| KR | 10 2010-00482 A | 5/2010 |

* cited by examiner

*Primary Examiner* — Larry Sternbane
(74) *Attorney, Agent, or Firm* — Lee & Morse, P.C.

(57) ABSTRACT

A capacitive touch panel sensor includes a plurality of driving-lines in a first direction, a plurality of sensing-lines in a second direction, a scan signal generator configured to generate a scan signal corresponding to at least one scan pulse, and to output the scan signal to the driving-lines, and a capacitance detector configured to receive a capacitance sensing signal output from the sensing-lines, and to detect a touched location based on the capacitance sensing signal, wherein the scan signal generator is configured to output the scan signal during first noise avoidance time periods, each first noise avoidance time period being in a respective horizontal time period of a display driving operation, and wherein the capacitance detector is configured to receive the capacitance sensing signal during the first noise avoidance time periods.

19 Claims, 18 Drawing Sheets

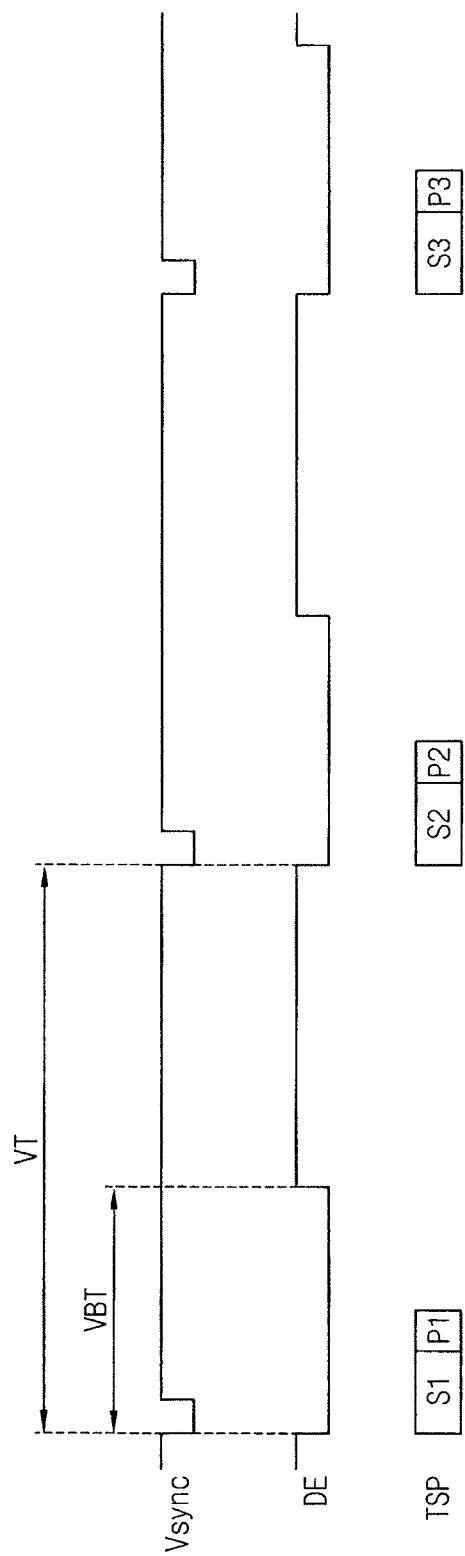

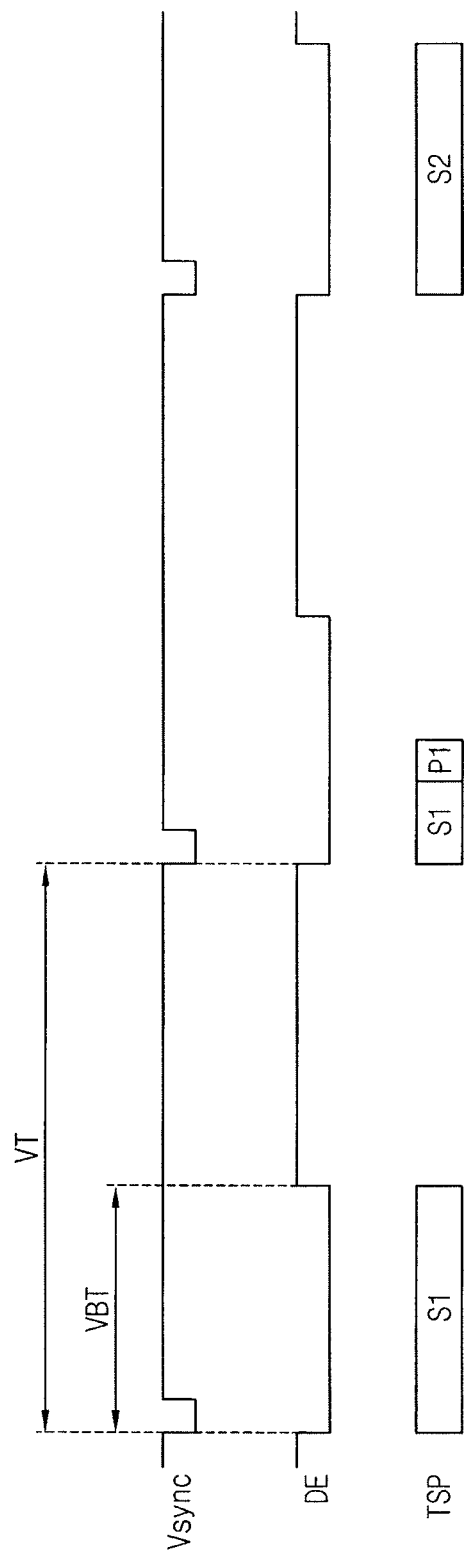

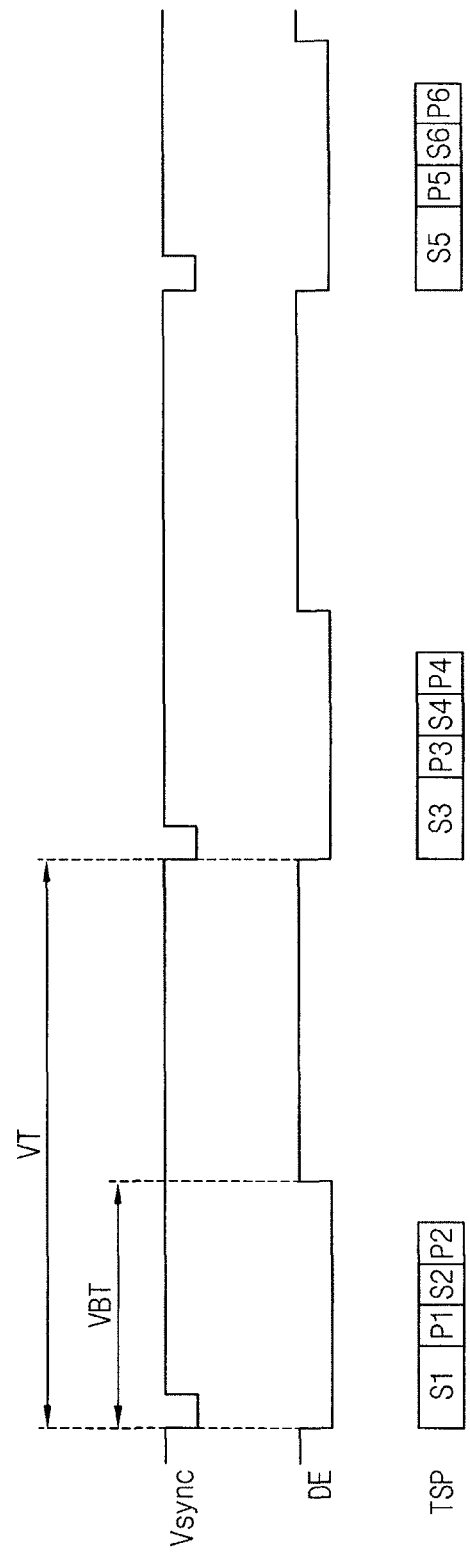

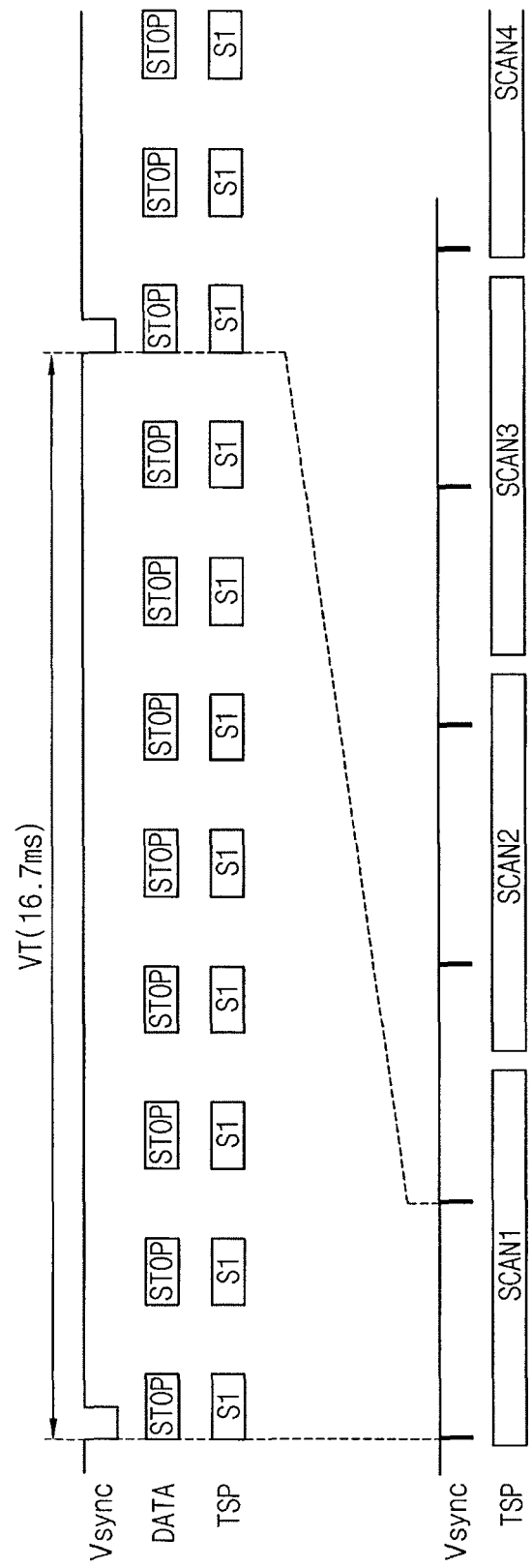

CAPACITIVE TOUCH PANEL SENSOR SYNCHRONIZED WITH DISPLAY DRIVING OPERATION AND TOUCH PANEL DISPLAY DEVICE HAVING THE SAME

CROSS-REFERENCE TO RELATED APPLICATION

This application claims priority under 35 USC §119 to Korean Patent Applications No. 10-2012-0060243, filed on Jun. 5, 2012, in the Korean Intellectual Property Office (KIPO), the contents of which are incorporated herein in its entirety by reference.

BACKGROUND

1. Field

Example embodiments relate generally to a touch panel sensor. More particularly, embodiments of the inventive concept relate to a capacitive touch panel sensor, and a touch panel display device having the same.

2. Description of the Related Art

A mobile device (e.g., a smart-phone) mostly includes a touch panel sensor according to a mobile convergence trend. The touch panel sensor may be classified into a capacitive touch panel sensor, a resistive touch panel sensor, a light sensing touch panel sensor, etc. Recently, the capacitive touch panel sensor that detects capacitance changes caused by a touch of an external electric conductor, such as a finger, is widely used as the touch panel sensor.

Generally, the capacitive touch panel sensor is coupled to a display device (e.g., over the display device or under the display device). In addition, the capacitive touch panel sensor performs a sensor driving operation in synchronization with the display device. Thus, a display driving operation that is performed by the display device may change (i.e., may influence) capacitance between transmitting (TX) electrodes and receiving (RX) electrodes of the capacitive touch panel sensor. As a result, touch sensitivity of the capacitive touch panel sensor may be degraded.

SUMMARY

Some example embodiments provide a capacitive touch panel sensor capable of preventing a sensor driving operation from being influenced by a display driving operation when a display device performs the display driving operation.

Some example embodiments provide a touch panel display device having the capacitive touch panel sensor.

According to some example embodiments, a capacitive touch panel sensor may include a plurality of driving-lines (TX) formed in a first direction, a plurality of sensing-lines (RX) formed in a second direction, a scan signal generator that generates a scan signal corresponding to at least one scan pulse and outputs the scan signal to the driving-lines, and a capacitance detector that receives a capacitance sensing signal output from the sensing-lines and detects a touched location based on the capacitance sensing signal. Here, the scan signal generator may output the scan signal during first noise avoidance time periods that exist in every horizontal time period of a display driving operation when a display device performs the display driving operation, and the capacitance detector may receive the capacitance sensing signal during the first noise avoidance time periods when the display device performs the display driving operation.

In example embodiments, each of the first noise avoidance time periods may be between a first time point and a second time point, the first time point being a time point elapsed by a predetermined first time from a time point at which a horizontal synchronization signal is changed from an active state to an inactive state, the second time point being a time point at which the horizontal synchronization signal is changed from an inactive state to an active state or a time point before the time point at which the horizontal synchronization signal is changed from an inactive state to an active state.

In example embodiments, the first noise avoidance time periods may be determined within a range in which a data signal applied to a display panel is not changed when the display device performs the display driving operation.

In example embodiments, a sensor driving operation for one frame may be completed after at least one vertical time period elapses.

In example embodiments, the scan signal generator may further output the scan signal during second noise avoidance time periods that exist in every vertical blanking time period of the display driving operation when the display device performs the display driving operation, and the capacitance detector may further receive the capacitance sensing signal during the second noise avoidance time periods when the display device performs the display driving operation.

In example embodiments, each of the second noise avoidance time periods may be between a third time point and a fourth time point, the third time point being a time point elapsed by a predetermined second time from a time point at which a data enable signal is changed from an active state to an inactive state, the fourth time point being a time point at which the data enable signal is changed from an inactive state to an active state or a time point before the time point at which the data enable signal is changed from an inactive state to an active state.

In example embodiments, the second noise avoidance time periods may be determined within a range in which a data signal applied to a display panel is not changed when the display device performs the display driving operation.

In example embodiments, the third time point may correspond to a time point at which a vertical synchronization signal is changed from an inactive state to an active state.

According to some example embodiments, a capacitive touch panel sensor may include a plurality of driving-lines (TX) formed in a first direction, a plurality of sensing-lines (RX) formed in a second direction, a scan signal generator that generates a scan signal corresponding to at least one scan pulse and outputs the scan signal to the driving-lines, and a capacitance detector that receives a capacitance sensing signal output from the sensing-lines and detects a touched location based on the capacitance sensing signal. Here, the scan signal generator may output the scan signal during noise avoidance time periods that exist in every vertical blanking time period of a display driving operation when a display device performs the display driving operation, and the capacitance detector may receive the capacitance sensing signal during the noise avoidance time periods when the display device performs the display driving operation.

In example embodiments, each of the noise avoidance time periods may be between a first time point and a second time point, the first time point being a time point elapsed by a predetermined time from a time point at which a data enable signal is changed from an active state to an inactive state, the second time point being a time point at which the data enable signal is changed from an inactive state to an active state or a time point before the time point at which the data enable signal is changed from an inactive state to an active state.

In example embodiments, the noise avoidance time periods may be determined within a range in which a data signal applied to a display panel is not changed when the display device performs the display driving operation.

In example embodiments, a sensor driving operation for one frame may be completed within one vertical time period.

In example embodiments, a sensor driving operation for one frame may be completed after at least one vertical time period elapses.

In example embodiments, the first time point may correspond to a time point at which a vertical synchronization signal is changed form an inactive state to an active state.

In example embodiments, a sensor driving operation for one frame may begin in synchronization with a time point at which the vertical synchronization signal is changed from an inactive state to an active state.

In example embodiments, a sensor driving operation for one frame may begin in asynchronization with a time point at which the vertical synchronization signal is changed from an inactive state to an active state.

According to some example embodiments, a capacitive touch panel sensor may include a plurality of driving-lines (TX) formed in a first direction, a plurality of sensing-lines (RX) formed in a second direction, a scan signal generator that generates a scan signal corresponding to at least one scan pulse and that outputs the scan signal to the driving-lines, and a capacitance detector that receives a capacitance sensing signal output from the sensing-lines and detects a touched location based on the capacitance sensing signal. Here, the scan signal generator may output the scan signal during data stop time periods that are generated at a predetermined cycle when a display device performs a display driving operation, and the capacitance detector may receive the capacitance sensing signal during the data stop time periods when the display device performs the display driving operation.

In example embodiments, the data stop time periods may be generated by a frame memory device or a line memory device of the display device.

In example embodiments, a time period during which a sensor driving operation for one frame is performed may be shorter than one vertical time period of the display driving operation.

In example embodiments, a time period during which a sensor driving operation for one frame is performed may be longer than one vertical time period of the display driving operation.

According to some example embodiments, a touch panel display device may include a display panel that performs a display driving operation, a touch screen panel that performs a touch detecting operation, a display driver that controls the display panel, and a touch screen panel controller that controls the touch screen panel to perform the touch detecting operation during noise avoidance time periods.

In example embodiments, the noise avoidance time periods may correspond to noise avoidance time periods that exist in every horizontal time period of the display driving operation.

In example embodiments, the noise avoidance time periods may correspond to noise avoidance time periods that exist in every vertical blanking time period of the display driving operation.

In example embodiments, the noise avoidance time periods may correspond to data stop time periods that are generated at a predetermined cycle.

BRIEF DESCRIPTION OF THE DRAWINGS

Illustrative, non-limiting example embodiments will be more clearly understood from the following detailed description taken in conjunction with the accompanying drawings.

FIGS. 7A through 7D are timing diagrams illustrating examples in which a sensor driving operation for one frame is performed.

FIGS. 11A and 11B are timing diagrams illustrating examples in which a capacitive touch panel sensor of FIG. 1 performs a sensor driving operation during data stop time periods that are generated at a predetermined cycle.

DETAILED DESCRIPTION

Figure 1:
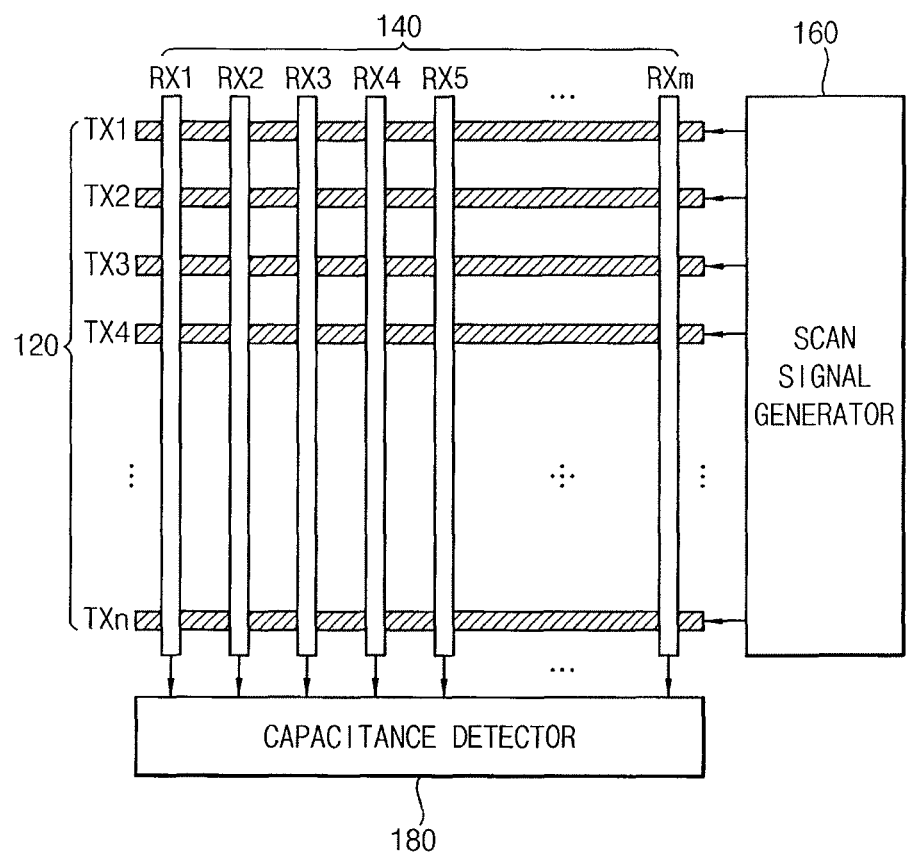
FIG. 1 is a block diagram illustrating a capacitive touch panel sensor according to example embodiments.

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
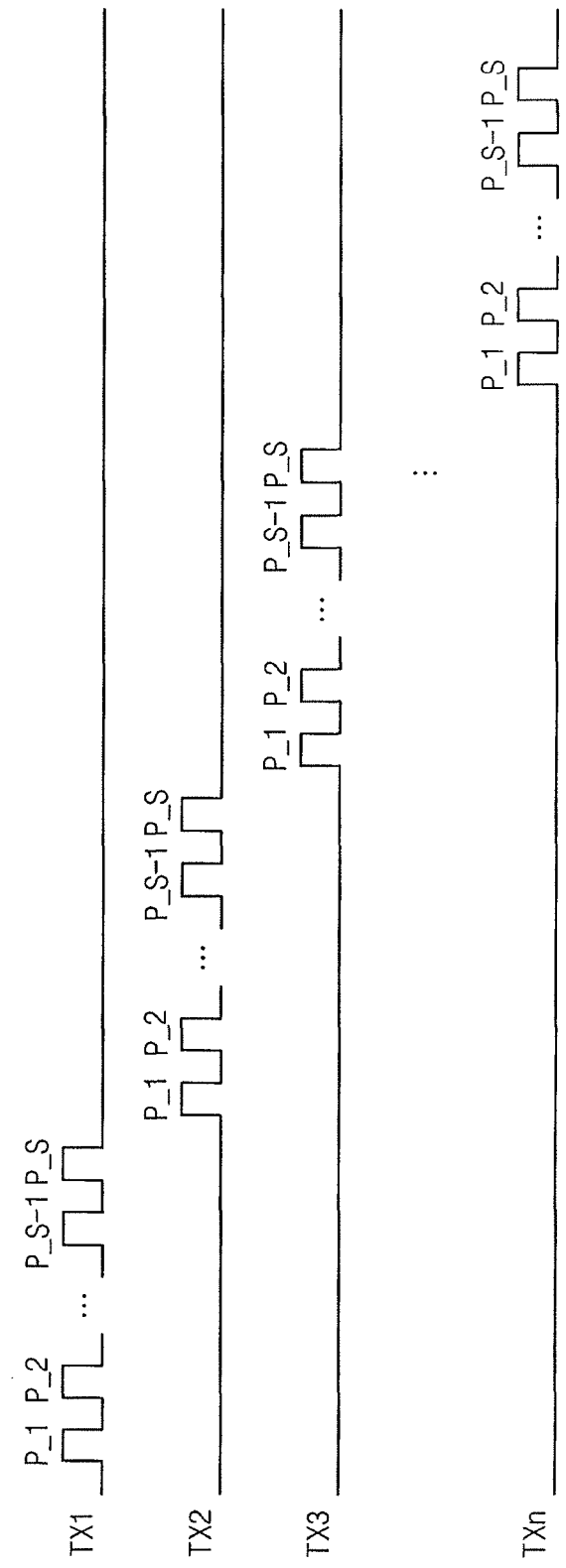
FIG. 2 is a timing diagram illustrating an example in which a scan signal is sequentially applied to driving-lines in a capacitive touch panel sensor of FIG. 1.

FIG. 1 is a block diagram illustrating a capacitive touch panel sensor according to example embodiments. FIG. 2 is a timing diagram illustrating an example in which a scan signal is sequentially applied to driving-lines in the capacitive touch panel sensor of FIG. 1.

Referring to FIG. 1, the capacitive touch panel sensor 100 may include a plurality of driving-lines 120 (e.g., TX1 through TXn), a plurality of sensing-lines 140 (e.g., RX1 through RXm), a scan signal generator 160, and a capacitance detector 180. Here, the scan signal generator 160 and the capacitance detector 180 may correspond to a touch screen panel (TSP) controller.

The driving-lines 120 may be formed in a first direction (e.g., X-axis direction). The sensing-lines 140 may be formed in a second direction (e.g., Y-axis direction). In one example embodiment, the driving-lines 120 and the sensing-lines 140 may be formed on different substrates. In another example embodiment, the driving-lines 120 and the sensing-lines 140 may be formed on the same substrate. Here, each of the driving-lines 120 may be formed by coupling a plurality of patterns to each other using a conductive coupling pattern having a low resistance, the patterns being formed on a substrate in the first direction. Similarly, each of the sensing-lines 140 may be formed by coupling a plurality of patterns to each other using a conductive coupling pattern having a low resistance, the patterns being formed on a substrate in the second direction. For example, the patterns constituting each of the driving-lines 120 may be Indium Tin Oxide (ITO) patterns having a thickness of about 100 Å to about 300 Å. In addition, the patterns constituting each of the sensing-lines 140 may also be, e.g., ITO patterns having a thickness of about 100 Å to about 300 Å.

Generally, when an external electric conductor, such as a finger, contacts the touch screen panel, a capacitance at the touch location (i.e., a touched intersecting point of the driving-lines 120 and the sensing-lines 140) is changed. Thus, the capacitive touch panel sensor 100 may detect the touched location (e.g., coordinates) corresponding the touched intersecting point of the driving-lines 120 and the sensing-lines 140 based on a capacitance sensing signal corresponding to the capacitance changes at the touched location.

In detail, the scan signal generator 160 may generate a scan signal corresponding to at least one scan pulse, and may output the scan signal to the driving-lines 120. The capacitance detector 180 may receive the capacitance sensing signal output from the sensing-lines 140, and may detect the touched location based on the capacitance sensing signal. In other words, when the scan signal generator 160 sequentially applies the scan signal to the driving-lines 120, a capacitance at the touched location may be changed if an external electric conductor, such as a finger, contacts the touch screen panel. Thus, the capacitance detector 180 may detect the touched location by sensing capacitance changes (e.g., capacitance reductions) at the touched location.

As illustrated in FIG. 2, since the scan signal includes S scan pulses P_1 through P_S, where S is a positive integer, the S scan pulses P_1 through P_S may be applied to each of the driving-lines 120. Thus, when the number of the driving-lines 120 is N, where N is a positive integer, S*N scan pulses may be needed. For example, charges that are generated by the S scan pulses P_1 through P_S applied to each of the driving-lines 120 may be detected by the capacitance detector 180, the capacitance detector 180 being coupled to each of the sensing-lines 140. Thus, the charges may be processed as capacitance information (i.e., the capacitance sensing signal). In one example embodiment, at the touched intersecting point of the driving-lines 120 and the sensing-lines 140, S capacitance changes may be detected in response to the S scan pulses P_1 through P_S, and the capacitance sensing signal may be generated by performing a noise filtering operation on the S capacitance changes. In another example embodiment, 2*S capacitance changes may be detected in response to both edges of the S scan pulses P_1 through P_S, and the capacitance sensing signal may be generated by performing a noise filtering operation on the 2*S capacitance changes. However, a sensing operation is not limited thereto.

Typically, in a liquid crystal display (LCD) device, noise due to a display driving operation may occur when a data signal is changed. As a result, the noise may be concentrated, e.g., may occur only, at time points at which a horizontal synchronization signal is changed from an inactive state (e.g., a logic high level) to an active state (e.g., a logic low level). In other words, noise may not occur during the horizontal synchronization signal but only during signal changes. Further, noise due to the display driving operation may not occur during a vertical blanking time period because the data signal is not changed in the vertical blanking time period. Therefore, the capacitive touch panel sensor 100 may perform a sensor driving operation during noise avoidance time periods, i.e., when noise is not generated. That is, the capacitive touch panel sensor 100 may perform a sensor driving operation during a horizontal time period of the display driving operation, during a vertical blanking time period of the display driving operation, and/or during data stop time periods that are generated at a predetermined cycle. The sensor driving operation of the capacitive touch panel sensor 100 may be performed by the touch screen panel controller (i.e., by the scan signal generator 160 and the capacitance detector 180). Hence, the sensor driving operation of the capacitive touch panel sensor 100 may not be influenced by the display driving operation of a display device.

As a result, a signal to noise (S/N) ratio may be greatly improved. In addition, a scan cycle, a scan pulse frequency, and the number of scan pulses for the sensor driving operation may be freely determined. Meanwhile, operations of the scan signal generator 160 and the capacitance detector 180 may be controlled by a specific controller that is located inside the scan signal generator 160 and the capacitance detector 180, or may be controlled by a specific controller that is located outside the scan signal generator 160 and the capacitance detector 180. However, it should be understood that operations of the scan signal generator 160 and the capacitance detector 180 may be controlled by various manners according to required conditions.

In one example embodiment, the scan signal generator 160 may output the scan signal during the noise avoidance time periods that exist in every horizontal time period of the display driving operation, and the capacitance detector 180 may receive the capacitance sensing signal during the noise avoidance time periods that exist in every horizontal time period of the display driving operation. Here, each of the noise avoidance time periods may be between a first time point and a second time point, the first time point being a time point elapsed by a predetermined time from a time point at which a horizontal synchronization signal is changed from an active state to an inactive state, the second time point being a time point at which the horizontal synchronization signal is changed from an inactive state to an active state or a time point before the time point at which the horizontal synchronization signal is changed from an inactive state to an active state. In another example embodiment, the scan signal generator 160 may output the scan signal during the noise avoidance time periods that exist in every vertical blanking time period of the display driving operation, and the capacitance detector 180 may receive the capacitance sensing signal during the noise avoidance time periods that exist in every vertical blanking time period of the display driving operation. Here, each of the noise avoidance time periods may be between a first time point and a second time point, the first time point being a time point elapsed by a predetermined time from a time point at which a data enable signal is changed from an active state to an inactive state, the second time point being a time point at which the data enable signal is changed from an inactive state to an active state or a time point before the time point at which the data enable signal is changed from an inactive state to an active state. In still another example embodiment, the scan signal generator 160 may output the scan signal during the data stop time periods that are generated at a predetermined cycle, and the capacitance detector 180 may receive the capacitance sensing signal during the data stop time periods that are generated at a predetermined cycle. Here, the data stop time periods may be generated by a frame memory device or a line memory device of the display device.

Figure 3:
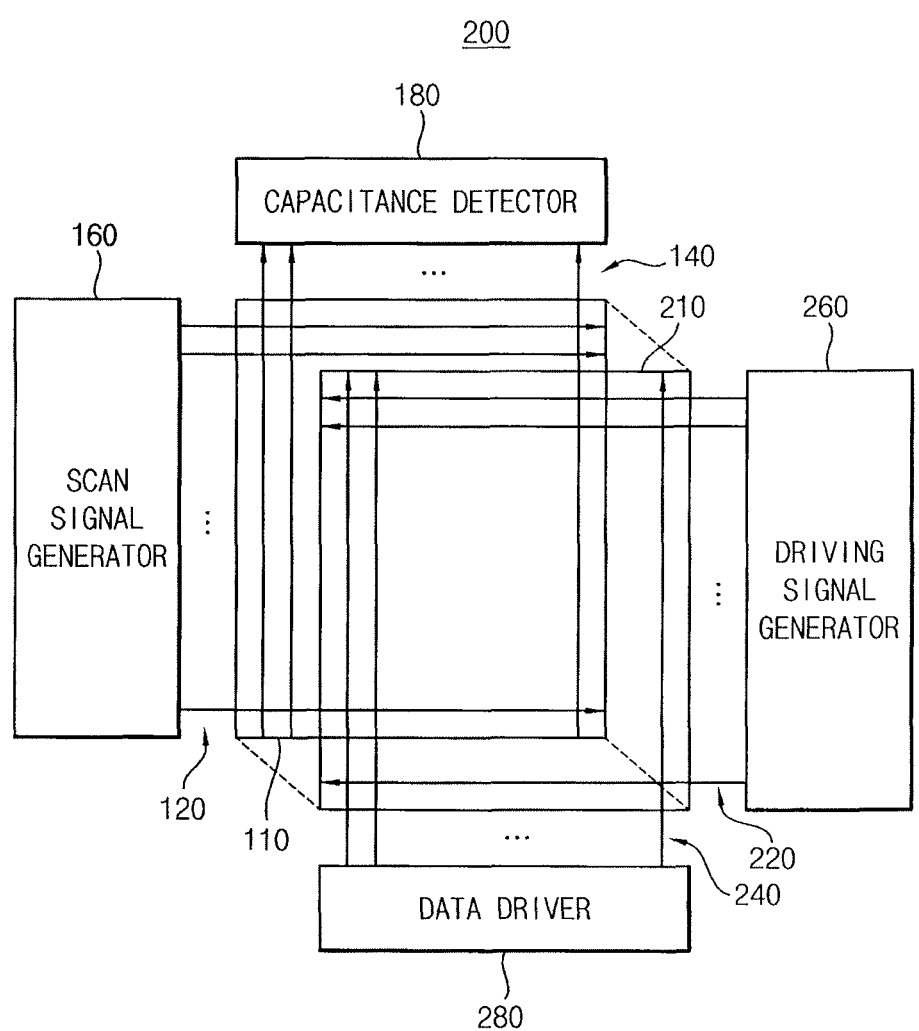
FIG. 3 is a block diagram illustrating an example in which a display device is coupled to a capacitive touch panel sensor of FIG. 1.
Figure 4:
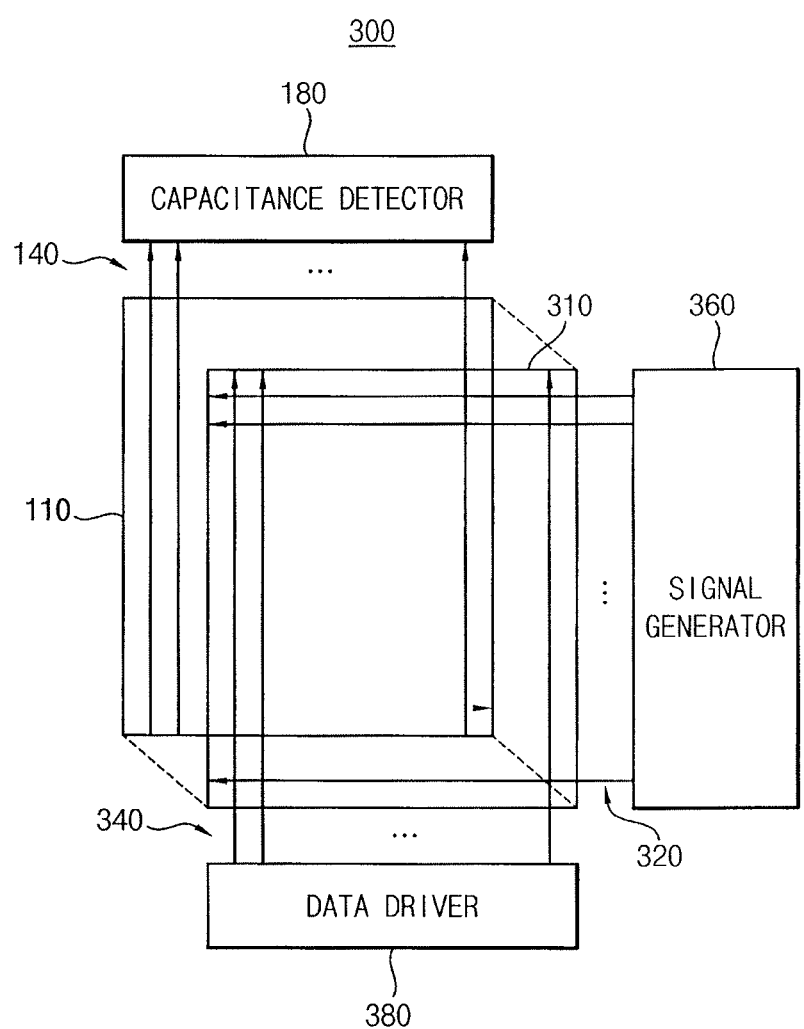
FIG. 4 is a block diagram illustrating another example in which a display device is coupled to a capacitive touch panel sensor of FIG. 1.

FIG. 3 is a block diagram illustrating an example of a display device coupled to the capacitive touch panel sensor of FIG. 1. FIG. 4 is a block diagram illustrating another example of a display device coupled to the capacitive touch panel sensor of FIG. 1.

As illustrated in FIG. 3, a touch panel display device 200 may include a touch screen panel 110, a touch screen panel controller (i.e., the scan signal generator 160 and the capacitance detector 180), a display panel 210, and a display driver (i.e., a driving signal generator 260 and a data driver 280). In other words, the capacitive touch panel sensor is implemented independently of the display device.

The touch screen panel 110 may include the plurality of driving-lines 120 that are formed in the first direction (e.g., X-axis direction), and the plurality of sensing-lines 140 that are formed in the second direction (e.g., Y-axis direction). The display panel 210 may include a plurality of driving-lines 220 that are formed in the first direction, and a plurality of data-lines 240 that are formed in the second direction. As described above, the touch screen panel controller may include the scan signal generator 160 and the capacitance detector 180, and the display driver may include the driving signal generator 260 and the data driver 280. However, the touch screen panel controller may further include additional components, and the display driver may also include additional components.

In another example, as illustrated in FIG. 4, a touch panel display device 300 may use a plurality of driving-lines 320 of a display device 310 as a plurality of driving-lines of the capacitive touch panel sensor. In another words, a single signal generator 360 may be used for both the display driver and the touch screen panel, while the capacitance detector 180 and a data driver 380 may be connected to data lines 140 and data lines 340, respectively. For example, a plurality of common voltage-lines of a LCD display device may be used as a plurality of driving-lines 320 of the capacitive touch panel sensor. In this case, a common voltage for driving the display panel 310 may be used as the scan signal for performing a touch detecting operation of the capacitive touch panel sensor.

Figure 5:
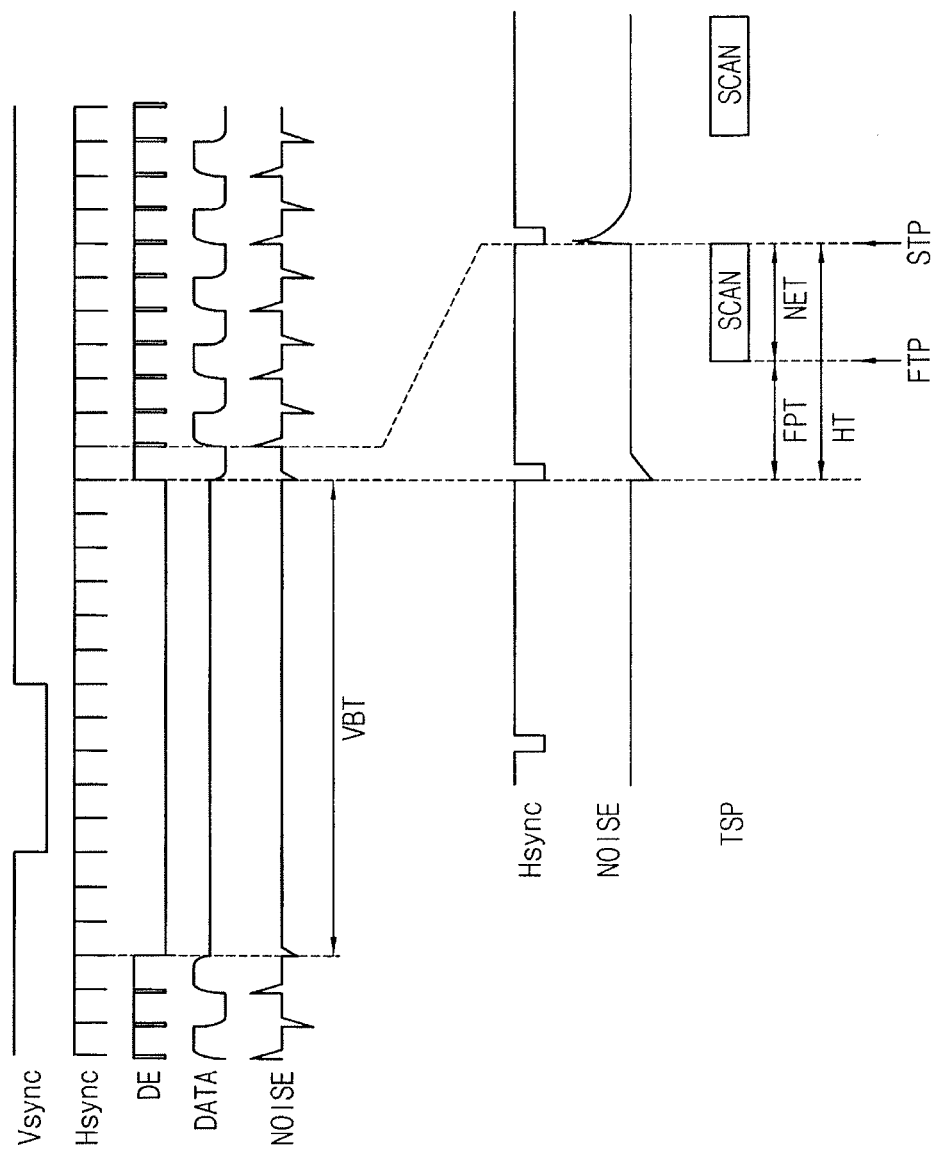
FIG. 5 is a timing diagram illustrating an example in which a capacitive touch panel sensor of FIG. 1 performs a sensor driving operation during noise avoidance time periods that exist in every horizontal time period of a display driving operation.

FIG. 5 is a timing diagram illustrating an example in which the capacitive touch panel sensor of FIG. 1 performs a sensor driving operation during noise avoidance time periods that exist in every horizontal time period of a display driving operation.

Referring to FIG. 5, a vertical synchronization signal Vsync may have an inactive state corresponding to a logic high level, and an active state corresponding to a logic low level. In addition, a horizontal synchronization signal Hsync may have an inactive state corresponding to a logic high level, and an active state corresponding to a logic low level. Here, a vertical time period may be defined by the vertical synchronization signal Vsync, and a horizontal time period HT may be defined by the horizontal synchronization signal Hsync. For example, one vertical time period may be defined as a time period between a time point at which the vertical synchronization signal Vsync is changed from an inactive state to an active state and a next time point at which the vertical synchronization signal Vsync is changed from an inactive state to an active state. In addition, one horizontal time period HT may be defined as a time period between a time point at which the horizontal synchronization signal Hsync is changed from an inactive state to an active state and a next time point at which the horizontal synchronization signal Hsync is changed from an inactive state to an active state (see enlarged portion in FIG. 5). In addition, a vertical blanking time period VBT may be defined as a time period in which a data enable signal DE is not applied. As illustrated in FIG. 5, since noises NOISE due to the display driving operation occur when a data signal DATA is changed, the noises NOISE due to the display driving operation may be concentrated at time points at which the horizontal synchronization signal Hsync is changed from an inactive state to an active state.

Thus, the capacitive touch panel sensor 100 may perform the sensor driving operation only during the noise avoidance time periods NET that exist in every horizontal time period HT of the display driving operation.

In detail, in the capacitive touch panel sensor 100, the scan signal generator 160 may output the scan signal during the noise avoidance time periods NET that exist in every horizontal time period HT of the display driving operation, and the capacitance detector 180 may receive the capacitance sensing signal during the noise avoidance time periods NET that exist in every horizontal time period HT of the display driving operation. Here, each of the noise avoidance time periods NET may be between a first time point FTP and a second time point STP, the first time point FTP being a time point elapsed by a predetermined first time FPT from a time point at which the horizontal synchronization signal Hsync is changed from an active state to an inactive state, the second time point STP being a time point at which the horizontal synchronization signal Hsync is changed from an inactive state to an active state or a time point before the time point at which the horizontal synchronization signal Hsync is changed from an inactive state to an active state. That is, the noise avoidance time periods NET that exist in each horizontal time period HT of the display driving operation may be determined within a range in which the data signal DATA applied to the display panel is not changed when the display device performs the display driving operation. As described above, since the capacitive touch panel sensor 100 performs the sensor driving operation only during the noise avoidance time periods NET that exist in every horizontal time period HT of the display driving operation when the display device performs the display driving operation, the sensor driving operation of the capacitive touch panel sensor 100 may not be influenced (e.g., noises) by the display driving operation of the display device. As a result, a signal to noise (S/N) ratio may be greatly improved. In addition, a scan cycle, a scan pulse frequency, and the number of scan pulses for the sensor driving operation may be freely determined. In some example embodiments, the sensor driving operation for one frame may be completed after at least one vertical time period elapses.

Figure 6:
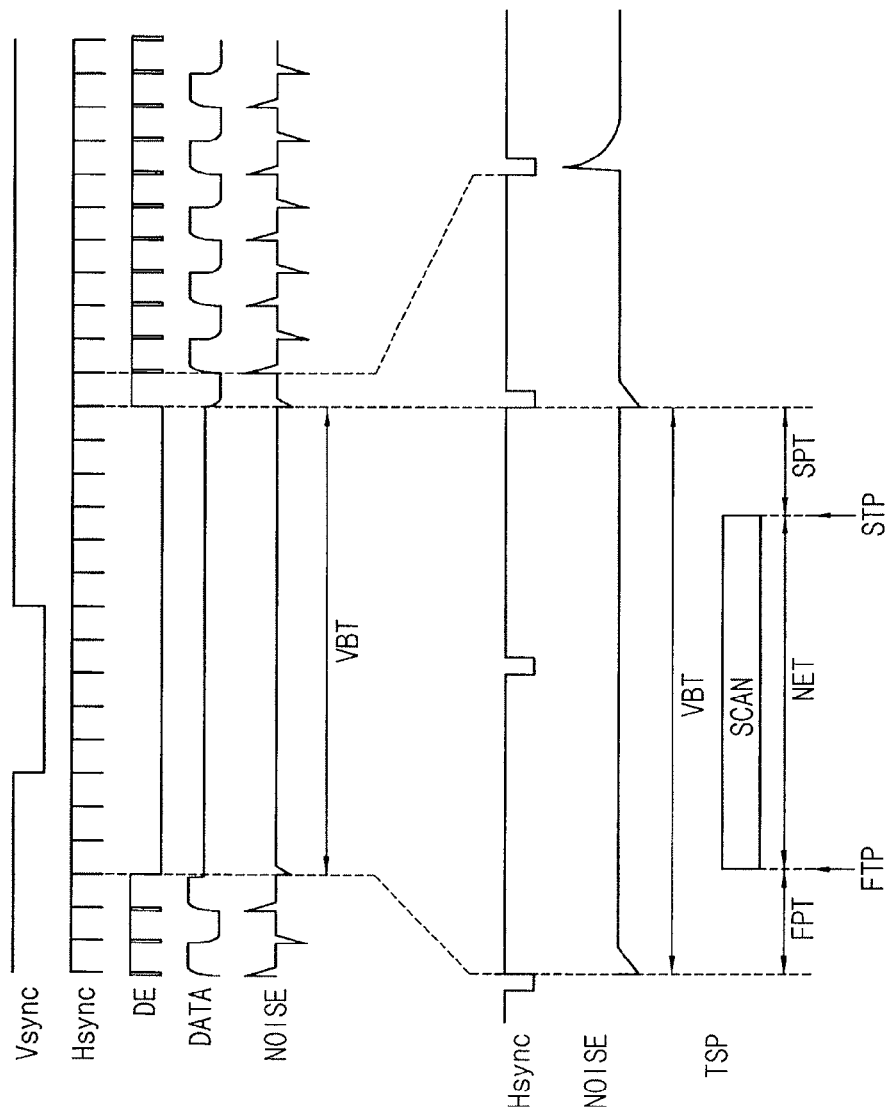
FIG. 6 is a timing diagram illustrating an example in which a capacitive touch panel sensor of FIG. 1 performs a sensor driving operation during noise avoidance time periods that exist in every vertical blanking time period of a display driving operation.

FIG. 6 is a timing diagram illustrating an example in which the capacitive touch panel sensor of FIG. 1 performs a sensor driving operation during noise avoidance time periods that exist in every vertical blanking time period of a display driving operation.

Referring to FIG. 6, since noises NOISE due to the display driving operation occur when a data signal DATA is changed, the noises NOISE may be concentrated at time points at which the horizontal synchronization signal Hsync is changed from an inactive state to an active state. On the other hand, the noises NOISE due to the display driving operation may not occur during the vertical blanking time period VBT because the data enable signal DE is not applied (i.e., the data signal DATA is not changed) in the vertical blanking time period VBT. Thus, the capacitive touch panel sensor 100 may perform the sensor driving operation only during the noise avoidance time periods NET that exist in every vertical blanking time period VBT of the display driving operation when the display device performs the display driving operation.

In detail, in the capacitive touch panel sensor 100, the scan signal generator 160 may output the scan signal during the noise avoidance time periods NET that exist in every vertical blanking time period VBT of the display driving operation, and the capacitance detector 180 may receive the capacitance sensing signal during the noise avoidance time periods NET that exist in every vertical blanking time period VBT of the display driving operation. Here, each of the noise avoidance time periods NET may be between a first time point FTP and a second time point STP, the first time point FTP being a time point elapsed by a predetermined first time FPT from a time point at which the data enable signal DE is changed from an active state to an inactive state, the second time point STP being a time point at which the data enable signal DE is changed from an inactive state to an active state or a time point before the time point at which the data enable signal DE is changed from an inactive state to an active state. In FIG. 6, it is illustrated that the second time point STP precedes the time point at which the data enable signal DE is changed from an inactive state to an active state by a predetermined second time SPT. That is, the noise avoidance time periods NET that exist in each vertical blanking time period VBT of the display driving operation may be determined within a range in which the data signal DATA is not applied when the display device performs the display driving operation.

In one example embodiment, the first time point FTP may correspond to a time point at which the vertical synchronization signal Vsync is changed from an inactive state to an active state. In this case, the sensor driving operation for one frame may begin in synchronization with a time point at which the vertical synchronization signal Vsync is changed from an inactive state to an active state. In another example embodiment, the sensor driving operation for one frame may begin in asynchronization with a time point at which the vertical synchronization signal Vsync is changed from an inactive state to an active state. In one example embodiment, the sensor driving operation for one frame may be completed within one vertical time period. In another example embodiment, the sensor driving operation for one frame may be completed after at least one vertical time period elapses. As described above, since the capacitive touch panel sensor 100 performs the sensor driving operation only during the noise avoidance time periods NET that exist in every vertical blanking time period VBT of the display driving operation when the display device performs the display driving operation, the sensor driving operation of the capacitive touch panel sensor 100 may not be influenced (e.g., noises) by the display driving operation of the display device. As a result, a signal to noise (S/N) ratio may be greatly improved. In addition, a scan cycle, a scan pulse frequency, and the number of scan pulses for the sensor driving operation may be freely determined.

FIGS. 7A through 7D are timing diagrams illustrating examples in which a sensor driving operation for one frame is performed.

Referring to FIGS. 7A through 7D, the capacitive touch panel sensor 100 may perform a sensor driving operation during noise avoidance time periods NET that exist in every vertical blanking time period VBT of a display driving operation when a display device performs the display driving operation. As described above, a vertical time period may be defined by a vertical synchronization signal Vsync. For example, one vertical time period VT may be defined as a time period between a time point at which the vertical synchronization signal Vsync is changed from an inactive state to an active state and a next time point at which the vertical synchronization signal is changed from an inactive state to an active state. For example, one vertical time period VT may be 16.7 ms (i.e., in case of 60 Hz). In addition, the vertical blanking time period VBT may be defined as a time period in which a data enable signal DE is not applied. Meanwhile, each of the noise avoidance time periods NET may be between a first time point and a second time point, the first time point being a time point elapsed by a predetermined first time from a time point at which the data enable signal DE is changed from an active state to an inactive state, the second time point being a time point at which the data enable signal DE is changed from an inactive state to an active state or a time point before the time point at which the data enable signal DE is changed from an inactive state to an active state. In FIGS. 7A through 7D, it is illustrated that the first time point corresponds to a time point at which the vertical synchronization signal Vsync is changed from an inactive state to an active state.

FIG. 7A shows an example in which the sensor driving operation for one frame begins in synchronization with a time point at which the vertical synchronization signal Vsync is changed from an inactive state to an active state, and then ends (i.e., completed) within one vertical time period VT. In FIG. 7A, it is illustrated that the sensor driving operation for a first frame, the sensor driving operation for a second frame, and the sensor driving operation for a third frame begin in synchronization with a time point at which the vertical synchronization signal Vsync is changed from an inactive state to an active state, respectively. Here, the sensor driving operation for the first frame may include a first scanning operation S1 and a first processing operation P1, the sensor driving operation for the second frame may include a second scanning operation S2 and a second processing operation P2, and the sensor driving operation for the third frame may include a third scanning operation S3 and a third processing operation P3. As illustrated in FIG. 7A, the sensor driving operation for the first frame, the sensor driving operation for the second frame, and the sensor driving operation for the third frame may be completed within one vertical time period VT, respectively. That is, the sensor driving operation for the first frame may be completed within a first vertical time period VT, the sensor driving operation for the second frame may be completed within a second vertical time period VT, and the sensor driving operation for the third frame may be completed within a third vertical time period VT.

FIG. 7B shows an example in which the sensor driving operation for one frame begins in synchronization with a time point at which the vertical synchronization signal Vsync is changed from an inactive state to an active state, and then ends (i.e., completed) after at least one vertical time period VT elapses. In FIG. 7B, it is illustrated that the sensor driving operation for a first frame and the sensor driving operation for a second frame begin in synchronization with a time point at which the vertical synchronization signal Vsync is changed from an inactive state to an active state, respectively. Here, the sensor driving operation for the first frame may include a first scanning operation S1 and a first processing operation P1, and the sensor driving operation for the second frame may include a second scanning operation S2 and a second processing operation P2. As illustrated in FIG. 7B, the sensor driving operation for the first frame may not be completed within one vertical time period VT. That is, the sensor driving operation for the first frame may be completed within two vertical time periods VT. For example, a part of the first scanning operation S1 may be performed during a first vertical time period VT, and then the rest of the first scanning operation S1 and the first processing operation P1 may be performed in a second vertical time period VT. Next, the sensor driving operation for the second frame may begin in a third vertical time period VT. For example, a part of the second scanning operation S2 may be performed during the third vertical time period VT, and then the rest of the second scanning operation S2 and the second processing operation P3 may be performed during a fourth vertical time period VT.

FIG. 7C shows an example in which the sensor driving operation for one frame begins in asynchronization with a time point at which the vertical synchronization signal Vsync is changed from an inactive state to an active state, and then ends (i.e., completed) within one vertical time period VT. In FIG. 7C, it is illustrated that the sensor driving operation for a second frame, the sensor driving operation for a fourth frame, and the sensor driving operation for a sixth frame begin in asynchronization with a time point at which the vertical synchronization signal Vsync is changed from an inactive state to an active state, respectively. Here, the sensor driving operation for a first frame may include a first scanning operation S1 and a first processing operation P1, the sensor driving operation for the second frame may include a second scanning operation S2 and a second processing operation P2, and the sensor driving operation for the sixth frame may include a sixth scanning operation S6 and a sixth processing operation P6. As illustrated in FIG. 7C, each sensor driving operation for the first through sixth frames may be completed within one vertical time period VT. That is, the first scanning operation S1, the first processing operation P1, the second scanning operation S2, and the second processing operation P2 may be performed in a first vertical time period VT, the third scanning operation S3, the third processing operation P3, the fourth scanning operation S4, and the fourth processing operation P4 may be performed in a second vertical time period VT, and the fifth scanning operation S5, the fifth processing operation P5, the sixth scanning operation S6, and the sixth processing operation P6 may be performed in a third vertical time period VT. In other words, each sensor driving operation for the first and second frames may be completed in the first vertical time period VT, each sensor driving operation for the third and fourth frames may be completed in the second vertical time period VT, and each sensor driving operation for the fifth and sixth frames may be completed in the third vertical time period VT.

Figure 7D:
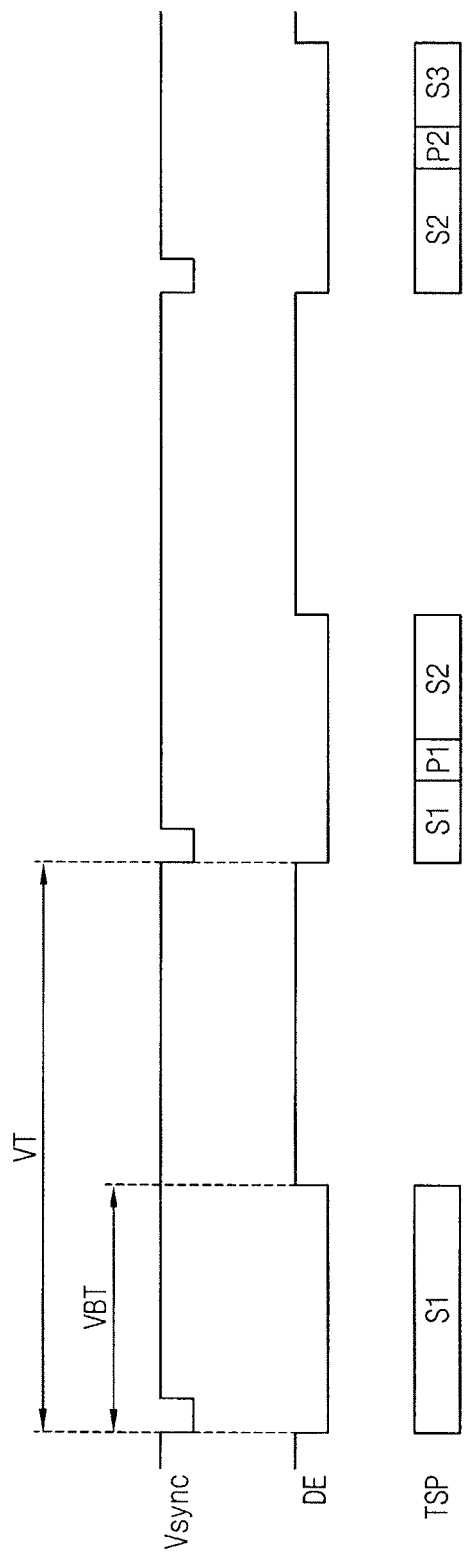

FIG. 7D shows an example in which the sensor driving operation for one frame begins in asynchronization with a time point at which the vertical synchronization signal Vsync is changed from an inactive state to an active state, and then ends (i.e., completed) after at least one vertical time period VT elapses. In FIG. 7D, it is illustrated that the sensor driving operation for a second frame and the sensor driving operation for a third frame begin in asynchronization with a time point at which the vertical synchronization signal Vsync is changed from an inactive state to an active state, respectively. Here, the sensor driving operation for a first frame may include a first scanning operation S1 and a first processing operation P1, the sensor driving operation for the second frame may include a second scanning operation S2 and a second processing operation P2, and the sensor driving operation for the third frame may include a third scanning operation S3 and a third processing operation P3. As illustrated in FIG. 7D, a part of the first scanning operation S1 may be performed in a first vertical time period VT, and then the rest of the first scanning operation S1, the first processing operation P1, and a part of the second scanning operation S2 may be performed in a second vertical time period VT. Next, the rest of the second scanning operation S2, the second processing operation P2, and a part of the third scanning operation S3 may be performed in a third vertical time period VT.

Figure 8:
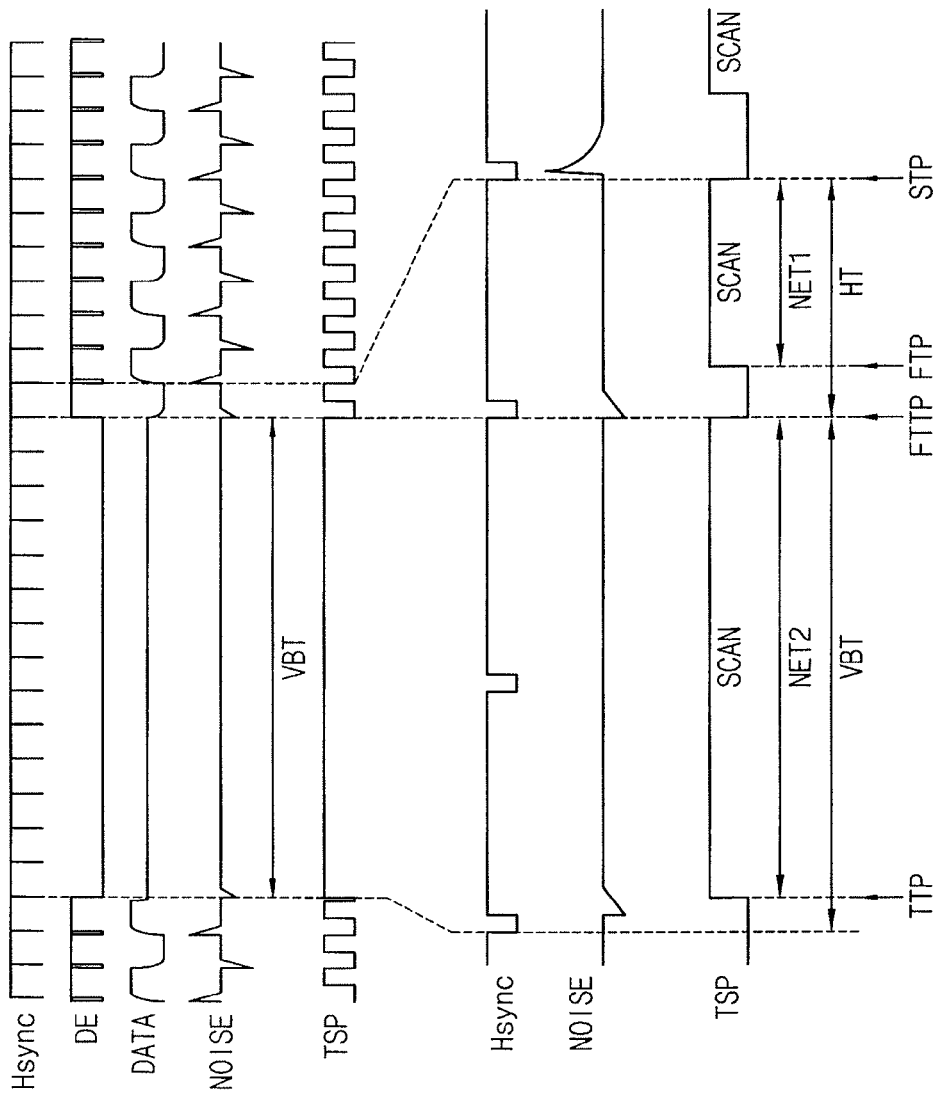
FIG. 8 is a timing diagram illustrating an example in which a capacitive touch panel sensor of FIG. 1 performs a sensor driving operation during first noise avoidance time periods that exist in every horizontal time period of a display driving operation, and during second noise avoidance time periods that exist in every vertical blanking time period of the display driving operation.

FIG. 8 is a timing diagram illustrating an example in which a capacitive touch panel sensor of FIG. 1 performs a sensor driving operation during first noise avoidance time periods that exist in every horizontal time period of a display driving operation, and during second noise avoidance time periods that exist in every vertical blanking time period of the display driving operation.

Referring to FIG. 8, the capacitive touch panel sensor 100 may perform the sensor driving operation during the first noise avoidance time periods NET1 that exist in every horizontal time period HT of the display driving operation, and during the second noise avoidance time periods NET2 that exist in every vertical blanking time period VBT of the display driving operation when the display device performs the display driving operation. As described above, since noises NOISE due to the display driving operation occur when a data signal DATA is changed, the noises NOISE may be concentrated on time points at which the horizontal synchronization signal Hsync is changed from an inactive state to an active state. On the other hand, the noises NOISE due to the display driving operation may not occur during the vertical blanking time period VBT in which the data signal DATA is not applied. Here, each of the first noise avoidance time periods NET1 may be between a first time point FTP and a second time point STP, the first time point FTP being a time point elapsed by a predetermined first time from a time point at which the horizontal synchronization signal Hsync is changed from an active state to an inactive state, the second time point STP being a time point at which the horizontal synchronization signal Hsync is changed from an inactive state to an active state or a time point before the time point at which the horizontal synchronization signal Hsync is changed from an inactive state to an active state. In addition, each of the second noise avoidance time periods NET2 may be between a third time point TTP and a fourth time point FTTP, the third time point TTP being a time point elapsed by a predetermined third time from a time point at which the data enable signal DE is changed from an active state to an inactive state, the fourth time point FTTP being a time point at which the data enable signal DE is changed from an inactive state to an active state or a time point before the time point at which the data enable signal DE is changed from an inactive state to an active state. That is, the first noise avoidance time periods NET1 and the second noise avoidance time periods NET2 may be determined within a range in which the data signal DATA applied to the display panel is not changed when the display device performs the display driving operation. As described above, since the capacitive touch panel sensor 100 performs the sensor driving operation during the first noise avoidance time periods NET1 that exist in every horizontal time period HT of the display driving operation, and during the second noise avoidance time periods NET2 that exist in every vertical blanking time period VBT of the display driving operation when the display device performs the display driving operation, the sensor driving operation of the capacitive touch panel sensor 100 may not be influenced (e.g., noises) by the display driving operation of the display device. As a result, a signal to noise (S/N) ratio may be greatly improved. In addition, a scan cycle, a scan pulse frequency, and the number of scan pulses for the sensor driving operation may be freely determined.

Figure 9:
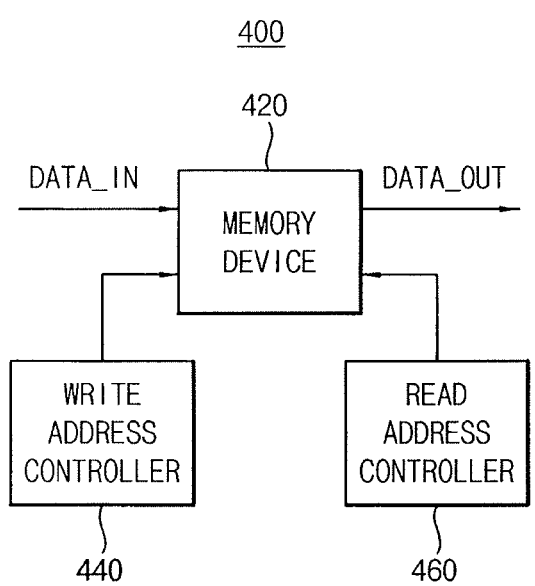
FIG. 9 is a block diagram illustrating a structure of a display device that generates data stop time periods at a predetermined cycle when a capacitive touch panel sensor of FIG. 1 performs a sensor driving operation during the data stop time periods.
Figure 10A:
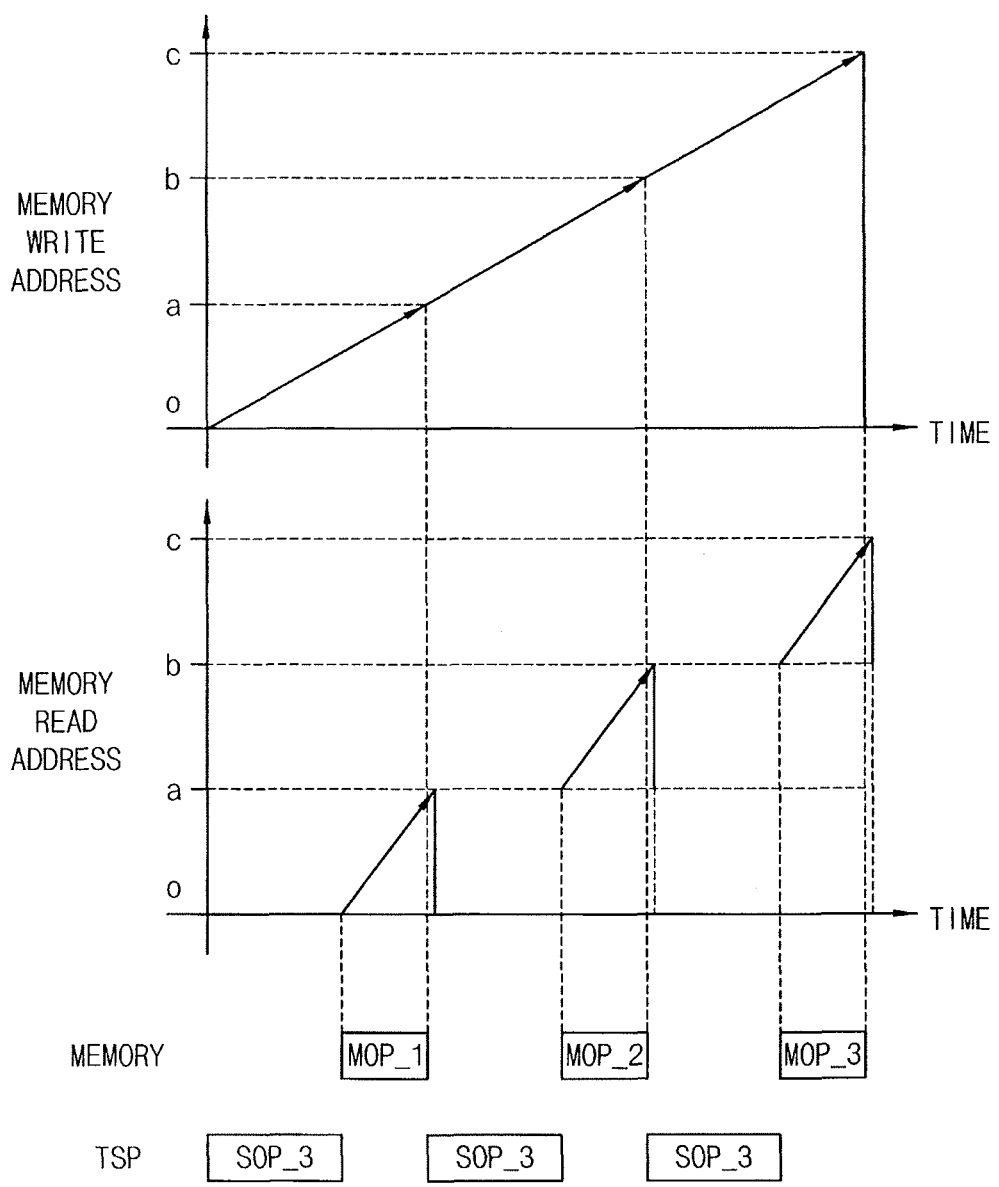
FIGS. 10A and 10B are graphs illustrating input/output (I/O) operations of a memory device in FIG. 9.
Figure 10B:
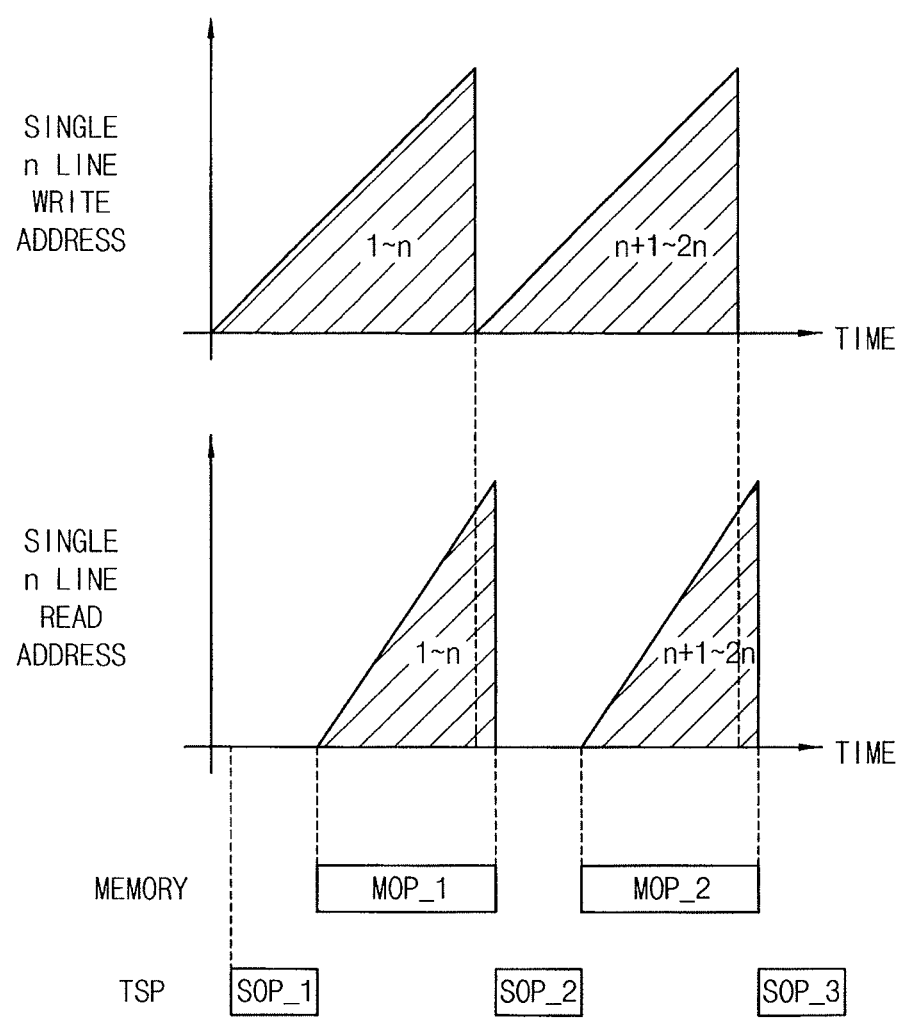

FIG. 9 is a block diagram illustrating a structure of a display device that generates data stop time periods at a predetermined cycle when a capacitive touch panel sensor of FIG. 1 performs a sensor driving operation during the data stop time periods. FIGS. 10A and 10B are graphs illustrating input/output (I/O) operations of a memory device in FIG. 9.

Referring to FIG. 9, the structure 400 that generates the data stop time periods at a predetermined cycle may include a memory device 420, a write address controller 440, and a read address controller 460. In one example embodiment, the memory device 420 may be a frame memory device. FIG. 10A shows an example of I/O operations of the memory device 420 (i.e., when the memory device 420 is the frame memory device). In another example embodiment, the memory device 420 may be a line memory device. FIG. 10B shows an example of I/O operations of the memory device 420 (i.e., when the memory device 420 is the line memory device).

Generally, noises due to the display driving operation occur when a data signal is changed. Hence, the capacitive touch panel sensor 100 may perform the sensor driving operation during the data stop time periods SOP_1, SOP_2, and SOP_3 that are generated at a predetermined cycle when the display device performs the display driving operation. Here, the data stop time periods SOP_1, SOP_2, and SOP_3 may be generated by delaying or stopping an output of an output data signal DATA_OUT by a predetermined time MOP_1, MOP_2, and MOP_3 after the memory device 420 receives an input data signal DATA_IN. Thus, since a data signal is not changed during the data stop time periods SOP_1, SOP_2, and SOP_3, the noises due to the display driving operation may not occur. In detail, in the capacitive touch panel sensor 100, the scan signal generator 160 may output the scan signal during the data stop time periods SOP_1, SOP_2, and SOP_3, and the capacitance detector 180 may receive the capacitance sensing signal during the data stop time periods SOP_1, SOP_2, and SOP_3. Here, each length of the data stop time periods SOP_1, SOP_2, and SOP_3 may be variously determined according to required conditions. In one example embodiment, the sensor driving operation for one frame may be completed within one vertical time period of the display driving operation. In another example embodiment, the sensor driving operation for one frame may be completed after at least one vertical time period of the display driving operation elapses.

The memory device 420 may receive the input data signal DATA_IN, and may output the output data signal DATA_OUT. Here, the memory device 420 may delay or stop an output of the output data signal DATA_OUT by the predetermined time MOP_1, MOP_2, and MOP_3. In one example embodiment, the predetermined time MOP_1, MOP_2, and MOP_3 may have the same value. In another example embodiment, the predetermined time MOP_1, MOP_2, and MOP_3 may have different values. For this operation, the write address controller 440 may control an operation for writing the input data signal DATA_IN to the memory device 420, and the read address controller 460 may control an operation for reading the output data signal DATA_OUT from the memory device 420. As illustrated in FIG. 10A, the memory device 420 may be the frame memory device. Thus, the write address controller 440 may sequentially write the input data signal DATA_IN to the memory device 420. However, the read address controller 460 may read the output data signal DATA_OUT from the memory device 420 at an interval of the predetermined time MOP_1, MOP_2, and MOP_3. As a result, the memory device 420 may generate the data stop time periods SOP_1, SOP_2, and SOP_3 when the output data signal DATA_OUT is applied to the display panel.

As illustrated in FIG. 10B, the memory device 420 may be the line memory device. Here, it is illustrated in FIG. 10B that the memory device 420 is the line memory device having n lines, where n is a positive integer. If n is the number of all gate-lines of the display panel, the line memory device having n lines may be the frame memory device. The write address controller 440 may sequentially write the input data signal DATA_IN to the memory device 420 by n lines, and the read address controller 460 may read the output data signal DATA_OUT from the memory device 420 by n lines. However, the predetermined time MOP_1, MOP_2, and MOP_3 may be inserted between an operation for writing the input data signal DATA_IN and an operation for reading the output data signal DATA_OUT. As a result, the memory device 420 may generate the data stop time periods SOP_1, SOP_2, and SOP_3 when the output data signal DATA_OUT is applied to the display panel. As n increases, the number of the data stop time periods SOP_1, SOP_2, and SOP_3 may increase. However, when the number of the data stop time periods SOP_1, SOP_2, and SOP_3 increases, display characteristics of the display device may be degraded. Therefore, the number of the data stop time periods SOP_1, SOP_2, and SOP_3 may be properly determined by considering this trade-off relation.

Figure 11A:
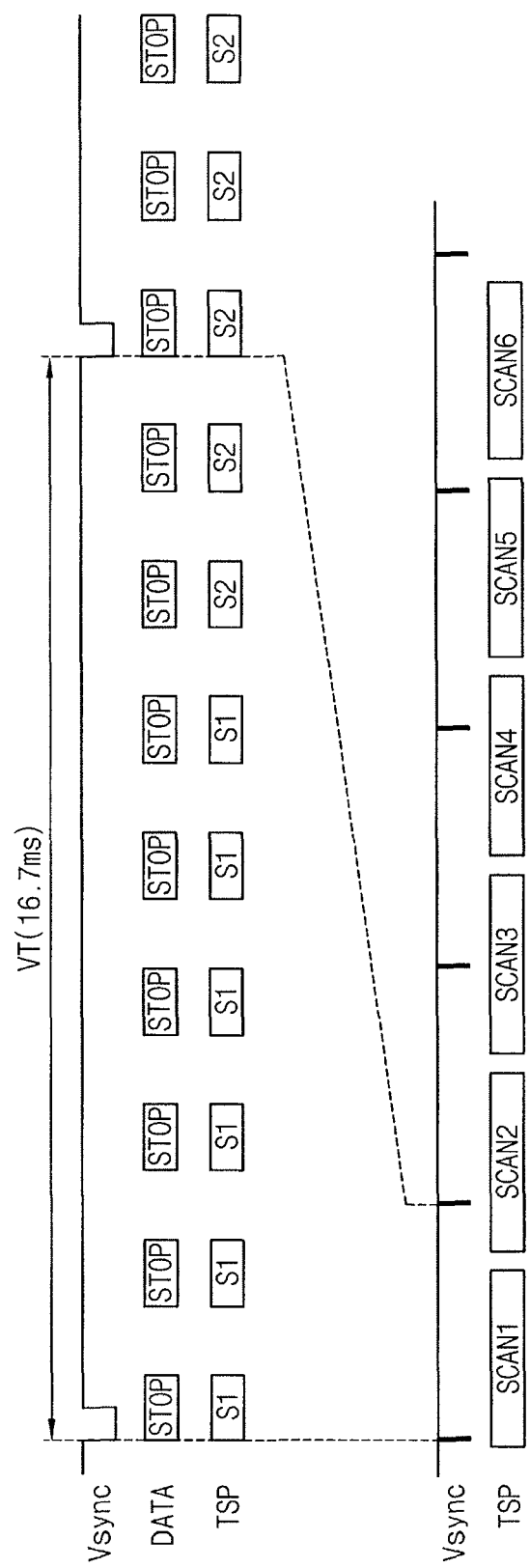

FIGS. 11A and 11B are timing diagrams illustrating examples in which a capacitive touch panel sensor of FIG. 1 performs a sensor driving operation during data stop time periods that are generated at a predetermined cycle.

Referring to FIGS. 11A and 11B, the capacitive touch panel sensor 100 may perform the sensor driving operation during the data stop time periods STOP that are generated at a predetermined cycle when the display device performs the display driving operation. Here, one vertical time period VT may be 16.7 ms (e.g., in case of 60 Hz). As illustrated in FIGS. 11A and 11B, the sensor driving operation SCAN1 for a first frame may include a first scanning operation S1 and a first processing operation, the sensor driving operation SCAN2 for a second frame may include a second scanning operation S2 and a second processing operation, and the sensor driving operation SCAN3 for a third frame may include a third scanning operation S3 and a third processing operation. FIG. 11A shows an example in which a time period during which the sensor driving operation for one frame is performed is shorter than one vertical time period VT of the display driving operation. FIG. 11B shows an example in which a time period during which the sensor driving operation for one frame is performed is longer than one vertical time period VT of the display driving operation. As described above, since the capacitive touch panel sensor 100 performs the sensor driving operation during the data stop time periods STOP that are generated at a predetermined cycle when the display device performs the display driving operation, the sensor driving operation of the capacitive touch panel sensor 100 may not be influenced (e.g., noises) by the display driving operation of the display device. As a result, a signal to noise (S/N) ratio may be greatly improved. In addition, a scan cycle, a scan pulse frequency, and the number of scan pulses for the sensor driving operation may be freely determined.

Figure 12:
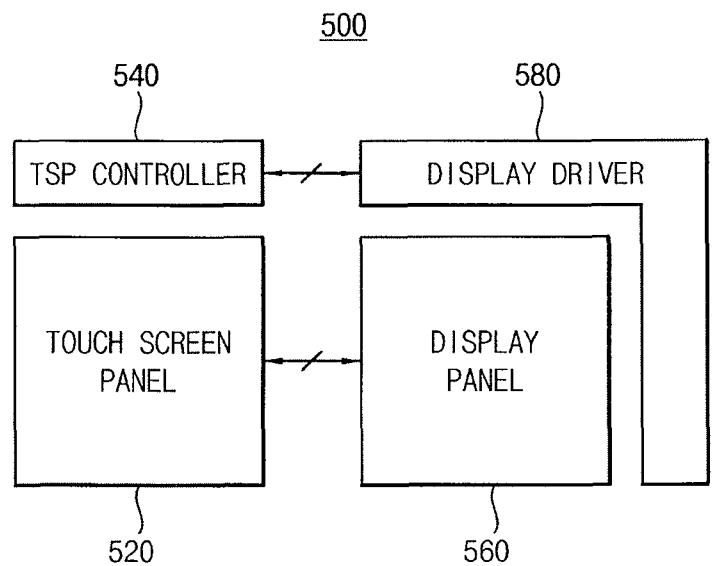
FIG. 12 is a block diagram illustrating an example of a touch panel display device having a capacitive touch panel sensor of FIG. 1.
Figure 13:
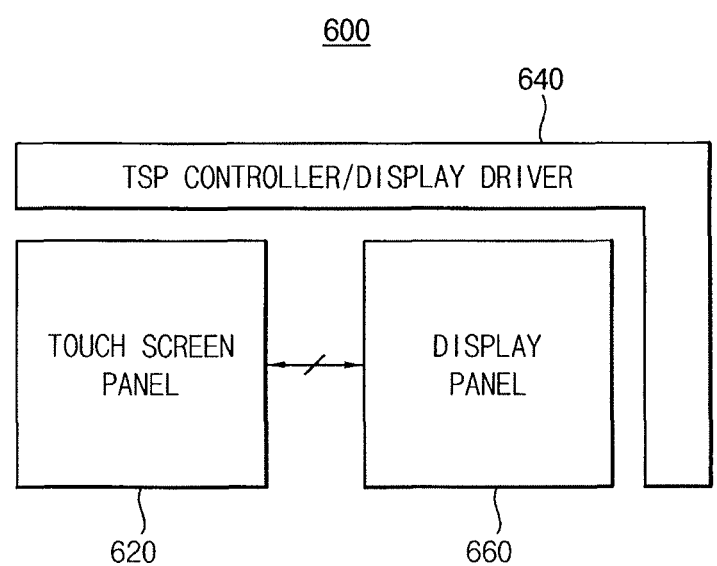
FIG. 13 is a block diagram illustrating another example of a touch panel display device having a capacitive touch panel sensor of FIG. 1.

FIG. 12 is a block diagram illustrating an example of a touch panel display device having a capacitive touch panel sensor of FIG. 1. FIG. 13 is a block diagram illustrating another example of a touch panel display device having a capacitive touch panel sensor of FIG. 1.

Referring to FIGS. 12 and 13, touch panel display devices 500 and 600 having the capacitive touch panel sensor 100 are illustrated. The touch panel display device 500 of FIG. 12 may include a touch screen panel 520, a touch screen panel controller 540, a display panel 560, and a display driver 580. The touch panel display device 600 of FIG. 13 may include a touch screen panel 620, a controller 640 having a touch screen panel controller and a display driver, and a display panel 660. As illustrated in FIG. 12, a touch screen panel controller 540 is separate from the display driver 580 in the touch panel display device 500 of FIG. 12. Here, the capacitive touch panel sensor 100 may correspond to the touch screen panel 520 and the touch screen panel controller 540. The touch screen panel 520 may be controlled by the touch screen panel controller 540. The display panel 560 may be controlled by the display driver 580. In this case, the touch screen panel controller 540 receive information related to noise avoidance time periods that exist in every horizontal time period of the display driving operation, noise avoidance time periods that exist in every vertical blanking time period of the display driving operation, and/or data stop time periods that are generated at a predetermined cycle (e.g., information related to sensor scan enable time periods) from the display driver 580, and may control a touch detecting operation based on the information. As illustrated in FIG. 13, the touch screen panel controller is integrated with the display driver (i.e., the controller 640) in the touch panel display device 600 of FIG. 13. Here, the capacitive touch panel sensor 100 may correspond to the touch screen panel 620 and the touch screen panel controller of the controller 640. The touch screen panel 620 and the display panel 660 may be controlled by the controller 640. In this case, the controller 640 may control the touch detecting operation by obtaining the information related to the noise avoidance time periods that exist in every horizontal time period of the display driving operation, the noise avoidance time periods that exist in every vertical blanking time period of the display driving operation, and/or the data stop time periods that are generated at a predetermined cycle (e.g., the information related to the sensor scan enable time periods).

Figure 14:
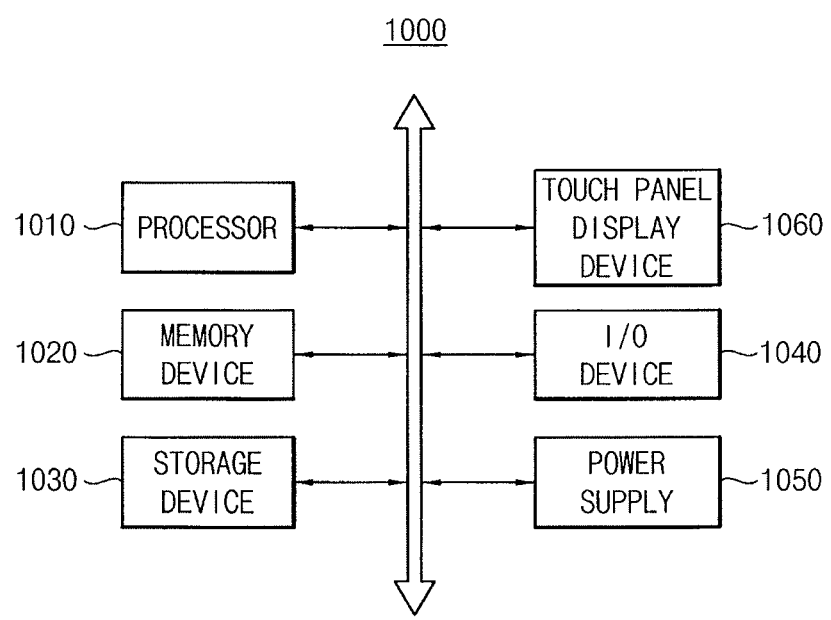
FIG. 14 is a block diagram illustrating an electric device that includes a touch panel display device having a capacitive touch panel sensor of FIG. 1.
Figure 15:
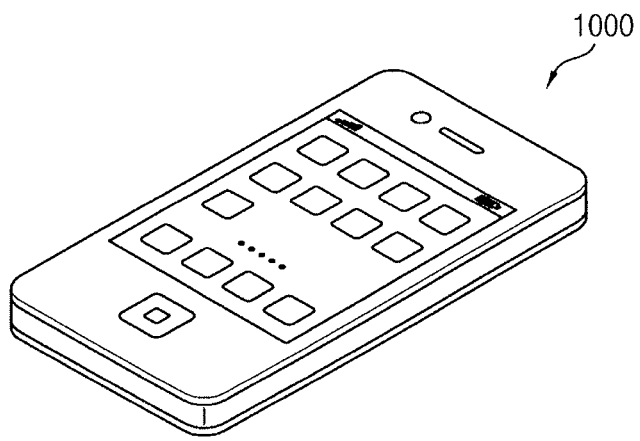
FIG. 15 is a diagram illustrating an example in which an electric device of FIG. 14 is implemented as a smart-phone.

FIG. 14 is a block diagram illustrating an electric device that includes a touch panel display device having the capacitive touch panel sensor of FIG. 1. FIG. 15 is a diagram illustrating an example in which the electric device of FIG. 14 is implemented as a smart-phone.

Referring to FIG. 14, the electric device 1000 may include a processor 1010, a memory device 1020, a storage device 1030, an input/output (I/O) device 1040, a power supply 1050, and a touch panel display device 1060. Here, the touch panel display device 1060 may correspond to the touch panel display device 500 of FIG. 12 or the touch panel display device 600 of FIG. 13. In addition, the electric device 1000 may further include a plurality of ports for communicating a video card, a sound card, a memory card, a universal serial bus (USB) device, other electric devices, etc.

The processor 1010 may perform various computing functions. The processor 1010 may be a micro processor, a central processing unit (CPU), etc. The processor 1010 may be coupled to other components via an address bus, a control bus, a data bus, etc. Further, the processor 1010 may be coupled to an extended bus such as a peripheral component interconnection (PCI) bus. The memory device 1020 may store data for operations of the electric device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc. The storage device 1030 may be a solid state drive (SSD) device, a hard disk drive (HDD) device, a CD-ROM device, etc.

The I/O device 1040 may be an input device such as a keyboard, a keypad, a mouse, etc., and an output device such as a printer, a speaker, etc. In some example embodiments, the touch panel display device 1060 may be included in the I/O device 1040. The power supply 1050 may provide a power for operations of the electric device 1000. The touch panel display device 1060 may communicate with other components via the buses or other communication links. As described above, the touch panel display device 1060 may include a capacitive touch panel sensor (i.e., a touch screen panel and a touch screen panel controller) and a display device (i.e., a display panel and a display driver). In some example embodiments, the touch screen panel controller and the display driver may be implemented as one integrated circuit (IC). When the display device performs a display driving operation, the capacitive touch panel sensor may perform a sensor driving operation during noise avoidance time periods that exist in every horizontal time period of the display driving operation, during noise avoidance time periods that exist in every vertical blanking time period of the display driving operation, and/or during data stop time periods that are generated at a predetermined cycle. Thus, the sensor driving operation of the capacitive touch panel sensor may not be influenced (e.g., noises) by the display driving operation of the display device. As a result, a signal to noise (S/N) ratio may be greatly improved. In addition, a scan cycle, a scan pulse frequency, and the number of scan pulses for the sensor driving operation of the capacitive touch panel sensor may be freely determined. As illustrated in FIG. 15, the electric device 1000 may be implemented as the smart-phone. However, an implementation of the electric device 1000 is not limited thereto.

The present inventive concept may be applied to a capacitive touch panel sensor, a touch panel display device, and an electric device having the same. For example, the present inventive concept may be applied to a computer, a laptop, a digital camera, a cellular phone, a smart phone, a smart pad, a television, a personal digital assistant (PDA), a portable multimedia player (PMP), a game console, a navigation system, etc.

A capacitive touch panel sensor according to example embodiments may perform a sensor driving operation during noise avoidance time periods in, e.g., every, horizontal time period of a display driving operation performed by a display device, during noise avoidance time periods in, e.g., every, vertical blanking time period of the display driving operation, and/or during data stop time periods generated at a predetermined cycle. Thus, the sensor driving operation of the capacitive touch panel sensor may not be influenced (e.g., noises) by the display driving operation of the display device.

As a result, a signal to noise (S/N) ratio may be greatly improved. In addition, a scan cycle, a scan pulse frequency, and the number of scan pulses for the sensor driving operation of the capacitive touch panel sensor may be freely determined. Furthermore, a touch panel display device having the capacitive touch panel sensor according to example embodiments may prevent the sensor driving operation of the capacitive touch panel sensor from being influenced (e.g., noises) by the display driving operation of the display device, thereby exhibiting improved touch sensitivity.

In contrast, a conventional touch panel display device may include a shield layer between the display device and the capacitive touch panel sensor. However, the shield layer may increase a thickness of the touch panel display device and a manufacturing cost of the touch panel display device. Further, the shield layer cannot be applied to a display device integrated with a touch panel sensor.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A capacitive touch panel sensor, comprising:
a plurality of driving-lines in a first direction;
a plurality of sensing-lines in a second direction;
a scan signal generator to generate a scan signal corresponding to at least one scan pulse, and to output the scan signal to the driving-lines; and
a capacitance detector to receive a capacitance sensing signal output from the sensing-lines, and to detect a touched location based on the capacitance sensing signal,
wherein the scan signal generator outputs the scan signal during first noise avoidance time periods, each first noise avoidance time period being in a respective horizontal time period of a display driving operation of a display panel,
wherein the capacitance detector receives the capacitance sensing signal during the first noise avoidance time periods,
wherein each of the first noise avoidance time periods is between a first time point and a second time point, the first time point being a time point elapsed by a predetermined first time from a time point at which a horizontal synchronization signal is changed from an active state to an inactive state, the second time point being a time point at which the horizontal synchronization signal is changed from an inactive state to an active state or a time point before the time point at which the horizontal synchronization signal is changed from an inactive state to an active state, and
wherein the first noise avoidance time periods are within a first range, the first range being a period in which a data signal applied to the display panel is not changed when the display panel performs the display driving operation.

2. The sensor of claim 1, wherein a sensor driving operation for one frame is completed after at least one vertical time period elapses.

3. The sensor of claim 1, wherein:
the scan signal generator further outputs the scan signal during second noise avoidance time periods, each second noise avoidance time period being in a respective vertical blanking time period of the display driving operation, and
wherein the capacitance detector further receives the capacitance sensing signal during the second noise avoidance time periods.

4. The sensor of claim 3, wherein each of the second noise avoidance time periods is between a third time point and a fourth time point, the third time point being a time point elapsed by a predetermined second time from a time point at which a data enable signal is changed from an active state to an inactive state, and the fourth time point being a time point at which the data enable signal is changed from an inactive state to an active state or a time point before the time point at which the data enable signal is changed from an inactive state to an active state.

5. The sensor of claim 4, wherein the second noise avoidance time periods are within a second range, the second range being a period in which a data signal applied to the display panel is not changed when the display panel performs the display driving operation.

6. The sensor of claim 4, wherein the third time point corresponds to a time point at which a vertical synchronization signal is changed from an inactive state to an active state.

7. A capacitive touch panel sensor, comprising:
a plurality of driving-lines in a first direction;
a plurality of sensing-lines in a second direction;
a scan signal generator to generate a scan signal corresponding to at least one scan pulse, and to output the scan signal to the driving-lines; and
a capacitance detector to receive a capacitance sensing signal output from the sensing-lines, and to detect a touched location based on the capacitance sensing signal,
wherein the scan signal generator outputs the scan signal during noise avoidance time periods, each noise avoidance time period being in a respective vertical blanking time of a display driving operation,
wherein the capacitance detector receives the capacitance sensing signal during the noise avoidance time periods,
wherein each of the noise avoidance time periods is between a first time point and a second time point, the first time point being a time point elapsed by a predetermined time from a time point at which a data enable signal is changed from an active state to an inactive state, and the second time point being a time point at which the data enable signal is changed from an inactive state to an active state or a time point before the time point at which the data enable signal is changed from an inactive state to an active state, and
wherein the noise avoidance time periods are within a range, the range being a period in which a data signal applied to the display panel is not changed when the display panel performs the display driving operation.

8. The sensor of claim 7, wherein a sensor driving operation for one frame is completed within one vertical time period.

9. The sensor of claim 7, wherein a sensor driving operation for one frame is completed after at least one vertical time period elapses.

10. The sensor of claim 7, wherein the first time point corresponds to a time point at which a vertical synchronization signal is changed form an inactive state to an active state.

11. The sensor of claim 10, wherein a sensor driving operation for one frame begins in synchronization with a time point at which the vertical synchronization signal is changed from an inactive state to an active state.

12. The sensor of claim 10, wherein a sensor driving operation for one frame begins in asynchronization with a time point at which the vertical synchronization signal is changed from an inactive state to an active state.

13. A capacitive touch panel sensor, comprising:
a plurality of driving-lines in a first direction;
a plurality of sensing-lines in a second direction;
a scan signal generator to generate a scan signal corresponding to at least one scan pulse, and to output the scan signal to the driving-lines; and
a capacitance detector to receive a capacitance sensing signal output from the sensing-lines, and to detect a touched location based on the capacitance sensing signal,
wherein the scan signal generator outputs the scan signal during data stop time periods generated at a predetermined cycle when a display device performs a display driving operation,
wherein the capacitance detector receives the capacitance sensing signal during the data stop time periods, and
wherein the data stop time periods are generated by a frame memory device or a line memory device of the display device.

14. The sensor of claim 13, wherein a time period during which a sensor driving operation for one frame is performed is shorter than one vertical time period of the display driving operation.

15. The sensor of claim 13, wherein a time period during which a sensor driving operation for one frame is performed is longer than one vertical time period of the display driving operation.

16. A touch panel display device, comprising:
a display panel to perform a display driving operation;
a touch screen panel to perform a touch detecting operation, the touch screen panel including a plurality of driving-lines in a first direction, and a plurality of sensing-lines in a second direction;
a display driver to control the display panel; and
a touch screen panel controller to control the touch screen panel to perform the touch detecting operation during noise avoidance time periods, the touch screen panel controller including:
a scan signal generator to generate a scan signal corresponding to at least one scan pulse, and to output the scan signal to the driving-lines, and
a capacitance detector to receive a capacitance sensing signal output from the sensing-lines, and to detect a touched location based on the capacitance sensing signal,
wherein the scan signal generator outputs the scan signal during data stop time periods generated at a predetermined cycle when a display device performs a display driving operation,
wherein the capacitance detector receives the capacitance sensing signal during the data stop time periods, and
wherein the data stop time periods are generated by a frame memory device or a line memory device of the display device.

17. The device of claim 16, wherein the noise avoidance time periods correspond to noise avoidance time periods in horizontal time periods of the display driving operation.

18. The device of claim 16, wherein the noise avoidance time periods correspond to noise avoidance time periods in vertical blanking time periods of the display driving operation.

19. The device of claim 16, wherein the noise avoidance time periods correspond to the data stop time periods generated at the predetermined cycle.

* * * * *